United States Patent
Nakajima

(10) Patent No.: US 10,033,936 B2
(45) Date of Patent: Jul. 24, 2018

(54) CONTROL APPARATUS, CONTROL METHOD, AND IMAGING APPARATUS

(71) Applicant: SONY CORPORATION, Tokyo (JP)

(72) Inventor: Keisuke Nakajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/128,182

(22) PCT Filed: Mar. 18, 2015

(86) PCT No.: PCT/JP2015/058034
§ 371 (c)(1),
(2) Date: Sep. 22, 2016

(87) PCT Pub. No.: WO2015/151813
PCT Pub. Date: Oct. 8, 2015

(65) Prior Publication Data
US 2017/0104909 A1    Apr. 13, 2017

(30) Foreign Application Priority Data

Mar. 31, 2014  (JP) .................................. 2014-071969

(51) Int. Cl.
*H04N 5/235*     (2006.01)

(52) U.S. Cl.
CPC ......... *H04N 5/2352* (2013.01); *H04N 5/2351* (2013.01)

(58) Field of Classification Search
None
See application file for complete search history.

(56) References Cited

U.S. PATENT DOCUMENTS

| 2009/0244317 A1* | 10/2009 | Makii ............... H04N 5/23245 348/229.1 |
| 2010/0214439 A1 | 8/2010 | Mitsuaki et al. |
| 2016/0381270 A1* | 12/2016 | Davis .................... H04N 5/238 348/362 |

FOREIGN PATENT DOCUMENTS

| CN | 101647269 A | 2/2010 |
| CN | 102547127 A | 7/2012 |
| EP | 2173088 A1 | 4/2010 |
| JP | 2002-204391 A | 7/2002 |
| JP | 2003-324648 A | 11/2003 |
| JP | 2007-336599 A | 12/2007 |
| JP | 2013-85279 A | 5/2013 |

(Continued)

OTHER PUBLICATIONS

International Search Report and Written Opinion of PCT Application No. PCT/JP2015/058034, dated Jun. 23, 2015, 7 pages of English Translation and 7 pages of ISRWO.

*Primary Examiner* — Roberto Velez
*Assistant Examiner* — Quan Pham
(74) *Attorney, Agent, or Firm* — Chip Law Group

(57) ABSTRACT

A control apparatus according to the present disclosure includes a frame rate control unit configured to control a frame rate of imaging, and a transmittance control unit configured to control transmittance of a filter which transmits light incident on an imaging element according to change of the frame rate so that brightness of an imaged subject is maintained. According to this configuration, even when the frame rate changes, it is possible to maintain fixed brightness according to change of the frame rate without causing change in imaging quality.

9 Claims, 10 Drawing Sheets

(56) References Cited

FOREIGN PATENT DOCUMENTS

WO 2009/013907 A 1/2009
WO 2009/013907 A1 1/2009

* cited by examiner

| FRAME RATE [fps] | NUMBER ADDED IN MEMORY |
|---|---|
| 8 | 1 |
| 7 | 1 |
| 6 | 1 |
| 5 | 1 |
| 4 | 2 |
| 3 | 2 |
| 2 | 4 |
| 1 | 8 |

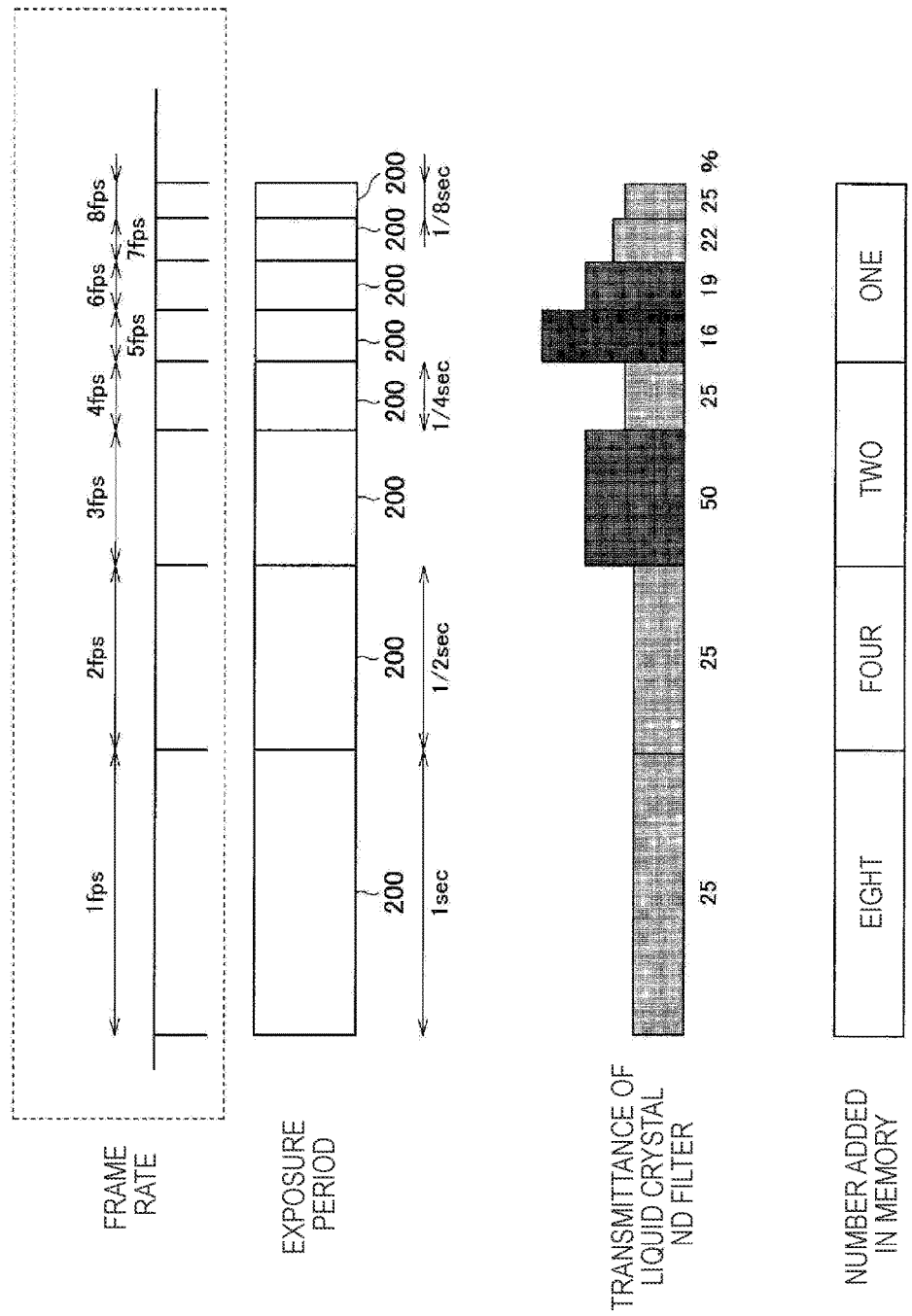

US 10,033,936 B2

CONTROL APPARATUS, CONTROL METHOD, AND IMAGING APPARATUS

CROSS REFERENCE TO RELATED APPLICATIONS

This application is a U.S. National Phase of International Patent Application No. PCT/JP2015/058034 filed on Mar. 18, 2015, which claims priority benefit of Japanese Patent Application No. 2014-071969 filed in the Japan Patent Office on Mar. 31, 2014. Each of the above-referenced applications is hereby incorporated herein by reference in its entirety.

TECHNICAL FIELD

The present disclosure relates to a control apparatus, a control method, and an imaging apparatus.

BACKGROUND ART

In related art, the following Patent Literature 1 discloses a technique of predicting a high brightness level, predicting a high brightness level range based on temporal displacement of the high brightness level and generating a mask pattern for reducing a light amount in the high brightness range.

CITATION LIST

Patent Literature

Patent Literature 1: JP 2002-204391A

SUMMARY OF INVENTION

Technical Problem

Recently, there is an imaging apparatus in which a frame rate can be changed during shooting of a moving image. When the frame rate is changed during shooting of the moving image, brightness changes. However, if shutter speed is changed in accordance with change of the frame rate so that brightness is maintained, the moving image becomes a so-called intermittent moving image. Further, when a diaphragm is adjusted in accordance with change of a frame rate so that brightness is maintained, image quality changes due to change of a depth of field. Still further, while there is a possible method in which a pixel value is multiplied by a gain in accordance with change of the frame rate, it leads to degradation in image quality due to decrease in a dynamic range of a signal.

Therefore, it is desired to adjust brightness according to change of a frame rate without causing a feeling of strangeness and without causing change in image quality.

Solution to Problem

According to the present disclosure, there is provided a control apparatus including: a frame rate control unit configured to control a frame rate of imaging; and a transmittance control unit configured to control transmittance of a filter which transmits light incident on an imaging element according to change of the frame rate so that brightness of an imaged subject is maintained.

In addition, according to the present disclosure, there is provided a control method including: controlling a frame rate of imaging; and controlling transmittance of a filter which transmits light incident on an imaging element according to change of the frame rate so that brightness of an imaged subject is maintained.

In addition, according to the present disclosure, there is provided an imaging apparatus including: an imaging element configured to image a subject image for each frame; a filter disposed at a subject side from the imaging element and configured to transmit light incident on the imaging element; a frame rate control unit configured to control a frame rate of imaging; and a transmittance control unit configured to control transmittance of the filter according to change of the frame rate so that brightness of the subject image imaged by the imaging element is maintained.

Advantageous Effects of Invention

As described above, according to the present disclosure, it is possible to adjust brightness according to change of a frame rate without causing a feeling of strangeness and without causing change in image quality. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a schematic diagram illustrating an example where division to restore an image according to the number added in the memory and change of density of the liquid crystal ND filter 103 are controlled in coordination with each other.

DESCRIPTION OF EMBODIMENT

Figure 1:
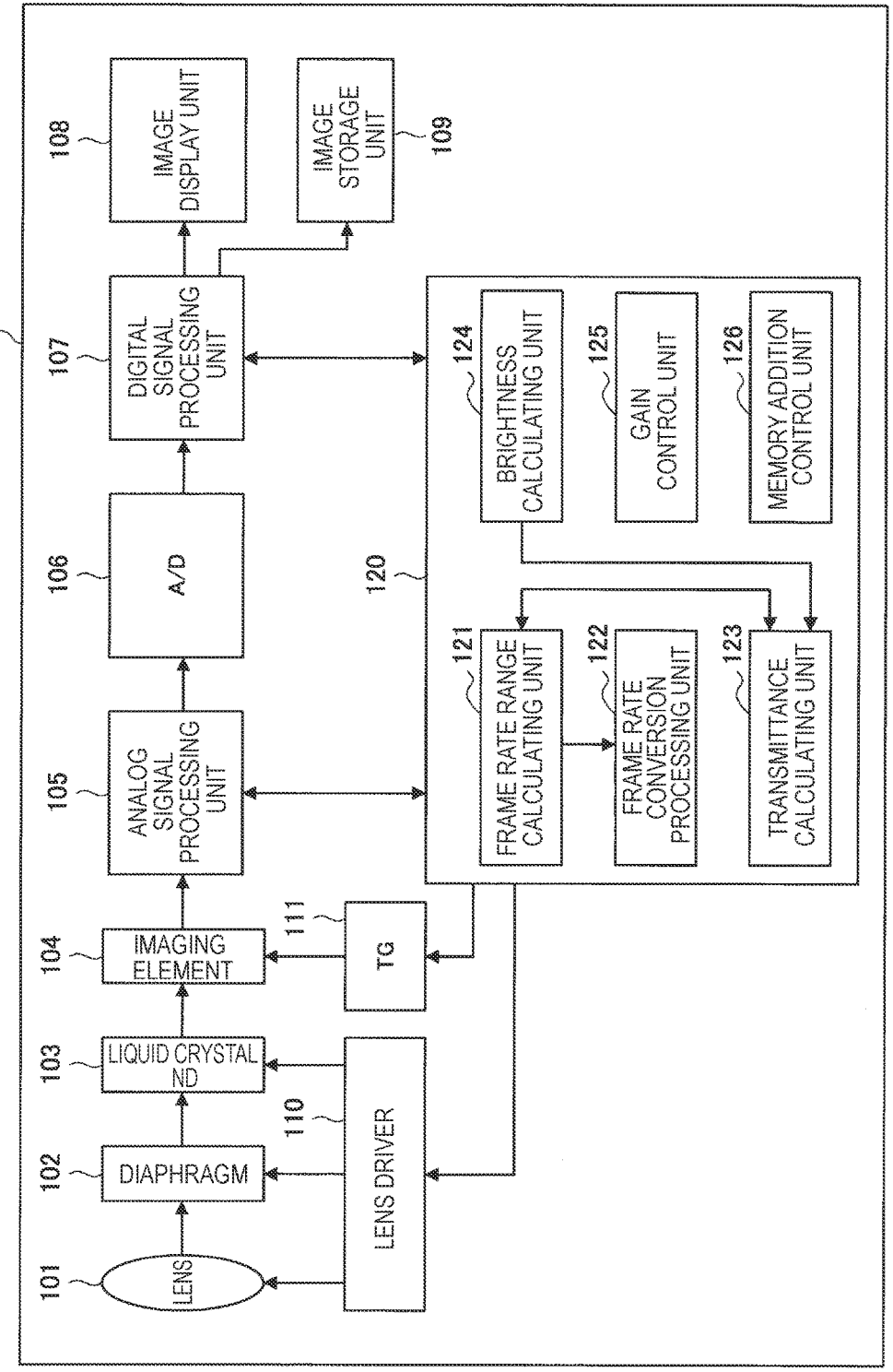
FIG. 1 is a schematic diagram illustrating a configuration example of an imaging apparatus according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Assumption of the Present Disclosure
2. Configuration Example of Imaging Apparatus According to the Present Embodiment
3. Combination Use with Adjustment of Exposure Amount by AE (Automatic Exposure)
4. Combination Use with Gain Control
5. Combination Use with Image Addition in Memory
   1. Assumption of the Present Disclosure For example, there is a camcorder which can perform shooting in an S & Q mode among camcorders which are host machines. In the S & Q mode, reproduction is performed while a frame rate upon shooting is changed. As an example, when shooting can be performed in a range of the frame rate around between 1 fps and 240 fps, by performing reproduction in a frame rate of 60 fps, it is possible to shoot fast motion or slow motion ranging from 60 times to 1/4 times.

When shooting is performed while the frame rate is changed, brightness of an image changes. For example, when shooting is performed at a frame rate of 60 fps under optimal exposure conditions, if the frame rate changes to 1 fps, the image becomes 60 times as bright as an image shot at a frame rate of 60 fps. Therefore, it is necessary to adjust an exposure amount so as to maintain fixed brightness.

Further, particularly, a user who performs shooting using a camcorder which is a host machine is afraid that there will be no continuity in images, and typically performs shooting in a shutter-off state. Here, the shutter-off state means a state where shooting is performed at the shutter speed of 1/60 sec when the shooting frame rate is 60 fps, and at the shutter speed of 1 sec when the shooting frame rate is 1 fps. In this case, when the frame rate changes from 60 fps to 1 fp, because the brightness becomes 60 times as bright as that upon 60 fps, it is necessary to adjust the exposure amount as described above.

Figure 2:
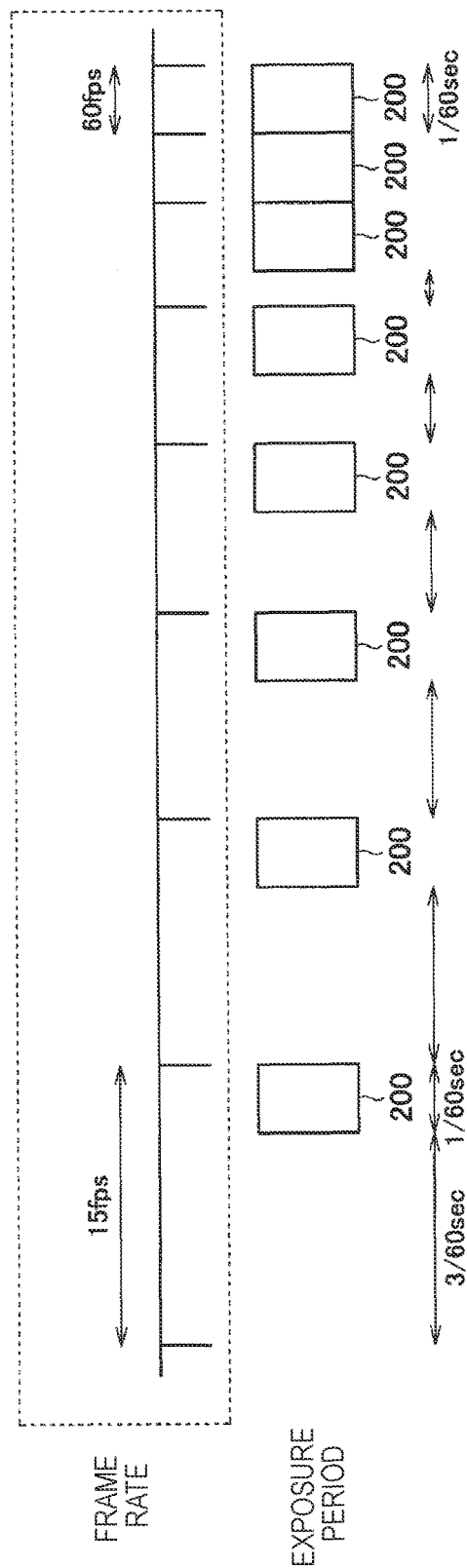
FIG. 2 is a schematic diagram illustrating an exposure state when an imaging frame rate is continuously changed while shutter speed is fixed to maintain brightness in an S & Q mode according to an embodiment of the present disclosure.

As a method for maintaining fixed brightness with respect to change of the frame rate in the S & Q mode, there is a possible method in which, when, for example, 60 fps is used as a reference, with respect to the change of the frame rate from 60 fps to 1 fps, the shutter speed is always made 1/60 sec (or higher) or a diaphragm is gradually closed in accordance with the frame rate as illustrated in FIG. 2 which will be described later.

However, when the shutter speed is made 1/60 sec, in the case of 1 fps, data corresponding to 1/60 sec is reflected to the image, while the remaining data corresponding to 59/60 sec is not reflected to the image, which results in a so-called intermittent moving image.

Further, when the diaphragm is made to follow change of the frame rate, a depth of field also changes, and the image quality is more affected by the influence such as occurrence of small aperture blur due to the aperture being excessively stopped down. Further, while there is a possible method in which the pixel value is multiplied by a negative gain according to change of the frame rate, because image quality degrades due to decrease in a dynamic range of a signal, this method cannot be basically employed.

Further, it is also possible to insert an ND filter into an imaging optical system and change the brightness according to the frame rate by switching the ND filter among a plurality of ND filters. However, if the ND filter is mechanically inserted into the imaging optical system, switching of the ND filter appears in an image. Further, it is difficult to mechanically switch the ND filter in coordination with change of the frame rate.

As described above, an effective method for maintaining brightness in coordination with change of the frame rate when it is desired to change the frame rate in the shutter-off state, has been desired.

2. Configuration Example of Imaging Apparatus According to the Present Embodiment FIG. 1 is a schematic diagram illustrating a configuration example of an imaging apparatus 100 according to an embodiment of the present disclosure. As illustrated in FIG. 1, the imaging apparatus 100 is configured to include a lens (imaging optical system) 101, a diaphragm 102, a liquid crystal ND filter 103, an imaging element 104, an analog signal processing unit 105, an A/D converting unit 106, a digital signal processing unit 107, an image display unit 108, an image storage unit 109, a lens driver 110, a timing generator (TG) 111, a system controller (microcomputer) 120 and an operating unit 113.

The imaging apparatus 100 illustrated in FIG. 1 receives light passing through the lens 101, the diaphragm 102 and the liquid crystal ND filter 103, at the imaging element 104, adds (multiplies) an image value to (by) an analog gain at the analog signal processing unit 105, and, after performing A/D conversion at the A/D converting unit 106, performs digital signal processing at the digital signal processing unit 107. The signal subjected to the digital signal processing is transmitted to the image display unit 108 and the image storage unit 109, and an image is output from the image display unit 108 and recorded at the image storage unit 109. Further, at the digital signal processing unit 107, a detection value for correction of automatic exposure (AE), or the like, is created from image data.

Further, the operating unit 113 accepts user operation and transmits operation input through the user operation to the system controller 120. The system controller 120 outputs an instruction of a control amount according to the user operation to each device. The operation input through the user operation includes operation for changing a frame rate, and operation for changing a gain in a region where transmittance is high, which will be described later. The system controller 120 instructs the lens driver 110 when it is desired to change a focus position, a zoom position, a diaphragm value, and transmittance of the liquid crystal ND filter 103. Further, the system controller 120 instructs the timing generator 111 when a value of an electronic shutter is changed, instructs the analog signal processing unit 105 when an analog gain is changed, and instructs the digital signal processing unit 107 when it is desired to change the digital signal processing.

FIG. 2 is a schematic diagram illustrating an exposure state when an imaging frame rate is continuously changed while the shutter speed is fixed to maintain brightness in the S & Q mode. When the frame rate is made lower from 60 fps to 15 fps, a width of an imaging cycle becomes wider. At this time, because fixed brightness is maintained even when the frame rate changes, there occurs a period when exposure is not performed at a low frame rate other than an exposure period (1/60 sec) while the shutter speed is fixed. Specifically, when the frame rate becomes 15 fps, while exposure is performed during the exposure period (1/60 sec) 200, exposure is not performed during the remaining 3/60 sec among 15 fp. Therefore, because shooting is not performed during 3/60 sec, a moving image becomes intermittent and discrete.

Figure 3:
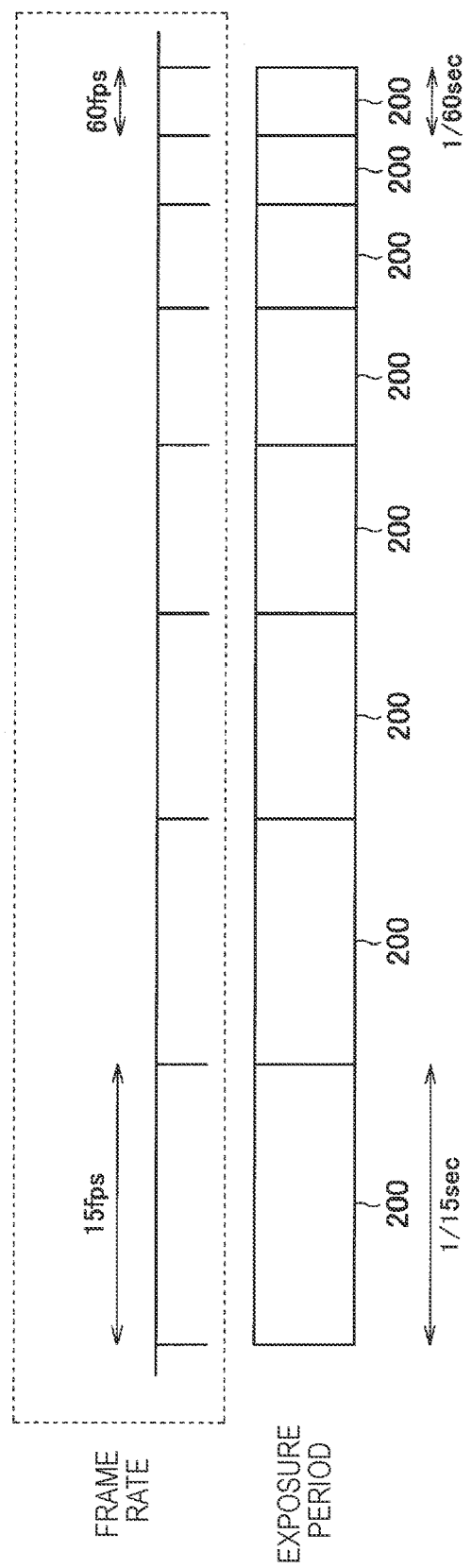
FIG. 3 is a schematic diagram illustrating an exposure state when the imaging frame rate is continuously changed in a shutter-off state which is ideal as a moving image in contrast to FIG. 2.

FIG. 3 is a schematic diagram illustrating an exposure state when the imaging frame rate is continuously changed in a shutter-off state which is ideal as a moving image in contrast to FIG. 2. As described above, the ideal shutter-off state means a state where shooting is performed at the shutter speed of 1/60 sec when the shooting frame rate is 60 fps, and shooting is performed at the shutter speed of 1 sec when the shooting frame rate is 1 fps. In FIG. 3, shooting is performed at the shutter speed of 1/60 sec when the shooting frame rate is 60 fps, and at the shutter speed of 1/15 sec when the shooting frame rate is 15 fps.

Unlike with FIG. 2, instead of a period corresponding to the period while exposure is not performed occurring, the exposure period 200 becomes longer in synchronization with the frame rate. Therefore, the brightness in the case where the frame rate is 15 fps becomes four times as high as a case where the frame rate is 60 fps.

Figure 4:
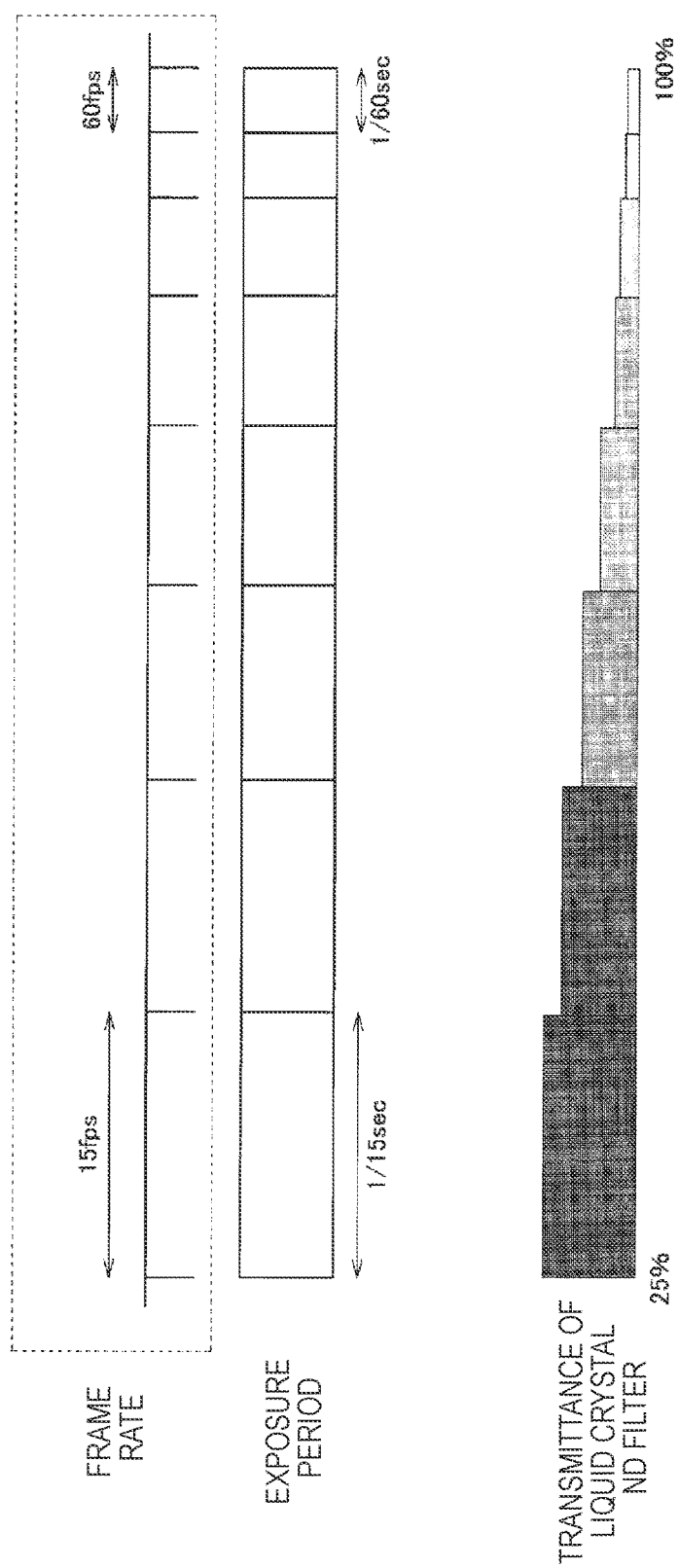
FIG. 4 is a diagram schematically illustrating control of changing density of a liquid crystal ND filter 103 in coordination with change of a frame rate while a state is put into a shutter-off state according to change of the frame rate as with in FIG. 3.

Therefore, in the present embodiment, when the frame rate changes, the liquid crystal ND filter 103 is controlled so that the fixed brightness is maintained according to change of the frame rate. FIG. 4 schematically illustrates control for changing density of the liquid crystal ND filter 103 in coordination with change of the frame rate while the state is put into the shutter-off state according to change of the frame rate as with in FIG. 3. As compared with FIG. 3, transmittance of the ND filter 103 is decreased when the frame rate is 15 fps compared to a case where the frame rate is 60 fps. Specifically, when the frame rate is 60 fps, the transmittance of the ND filter 103 is made 100%, while when the frame rate is 15 fps, the transmittance of the ND filter 103 is made 25%. By this means, even when the frame rate changes, it is possible to shoot a moving image which is not intermittent as in FIG. 2 while maintaining fixed brightness.

Figure 5:
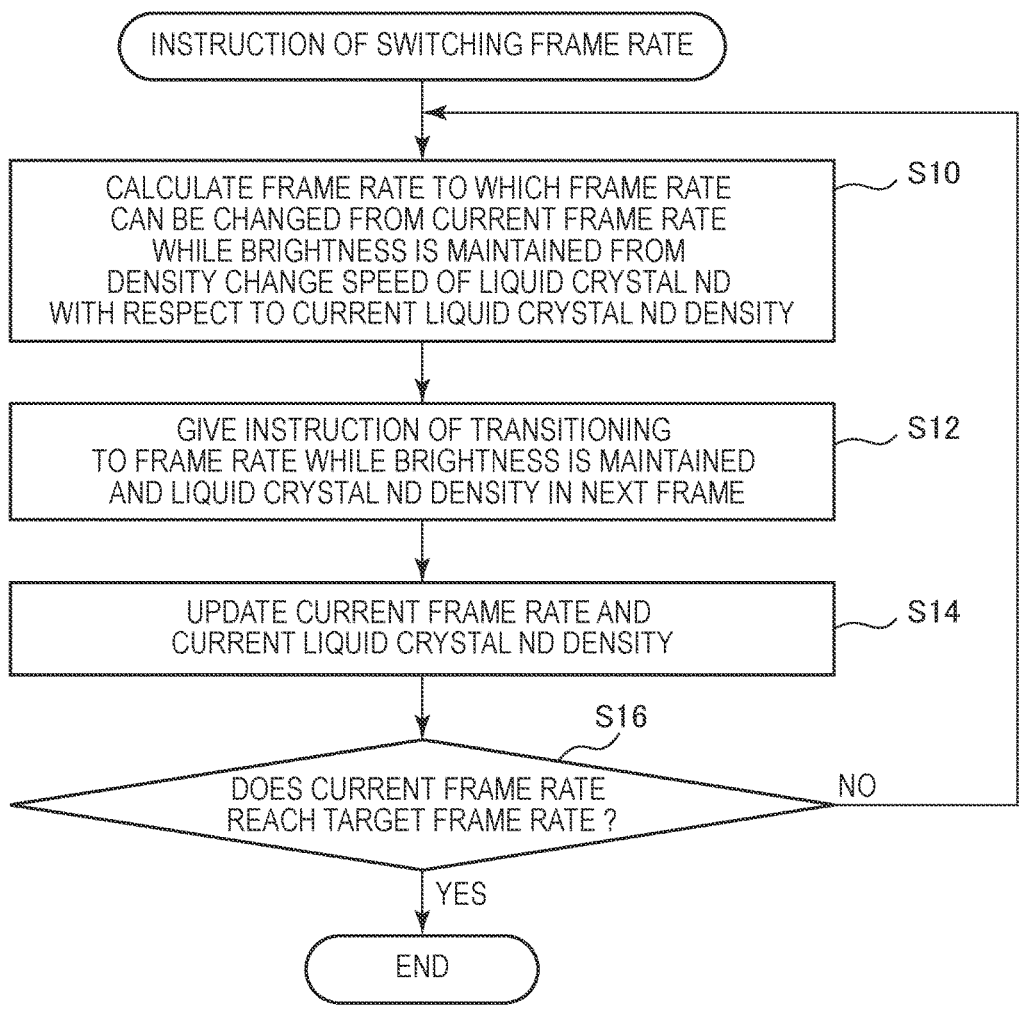
FIG. 5 is a flowchart illustrating processing in the imaging apparatus 100 according to the present embodiment.

FIG. 5 is a flowchart illustrating processing in the imaging apparatus 100 according to the present embodiment. When a user gives an instruction of switching the frame rate, first, in step S10, a range of the frame rate for which fixed brightness can be maintained by making transmittance (density) of the liquid crystal ND filter 103 coordinate is calculated based on operation speed information of the liquid crystal ND filter 103 held in advance. The range of the frame rate for which fixed brightness can be maintained is calculated at a frame rate range calculating unit 121 of the system controller 120. In the next step S12, in order to make the frame rate change within the range of the frame rate calculated in step S10, an instruction of transitioning to the frame rate is output to a frame rate conversion processing unit 122. The frame rate conversion processing unit 122 performs processing of converting the imaging frame rate. Further, a transmittance calculating unit 123 calculates transmittance corresponding to change of the frame rate when the frame rate changes within the range of the frame rate calculated in step S10 and outputs an instruction of transitioning to the transmittance to the lens driver 110. The lens driver 110 controls transmittance of the liquid crystal ND filter 103 based on the received instruction of transitioning to the transmittance.

In the next step S14, the current frame rate and the current transmittance of the liquid crystal ND filter 103 are updated. In the next step S16, if the current frame rate matches a target frame rate, the processing ends. On the other hand, if the current frame rate does not reach the target frame rate, the processing returns to step S10, and processing is repeated so that transition is performed again within the range for which fixed brightness can be maintained.

The target frame rate corresponds to a frame rate instructed by the user. For example, in FIG. 4, when the user gives an instruction to change the frame rate from current 60 fps to 15 fps, the target frame rate is 15 fps.

In such a case, the transmittance of the liquid crystal ND filter 103 may not instantly transition to the transmittance (in the case of FIG. 4, 25%) corresponding to the target frame rate according to the operation speed (responsiveness). In such a case, in step S10 in FIG. 5, the liquid crystal ND filter 103 is controlled to calculate the range of the frame rate for which fixed brightness can be maintained. Further, when it is impossible to make the frame rate transition to the target frame rate at a time, by repeating the processing in step S10 to S16, the frame rate is changed little by little in the range of the frame rate for which fixed brightness can be maintained according to the operation speed of the liquid crystal ND filter 103.

3. Combination Use with Adjustment of Exposure Amount by AE (Automatic Exposure)

Figure 6:
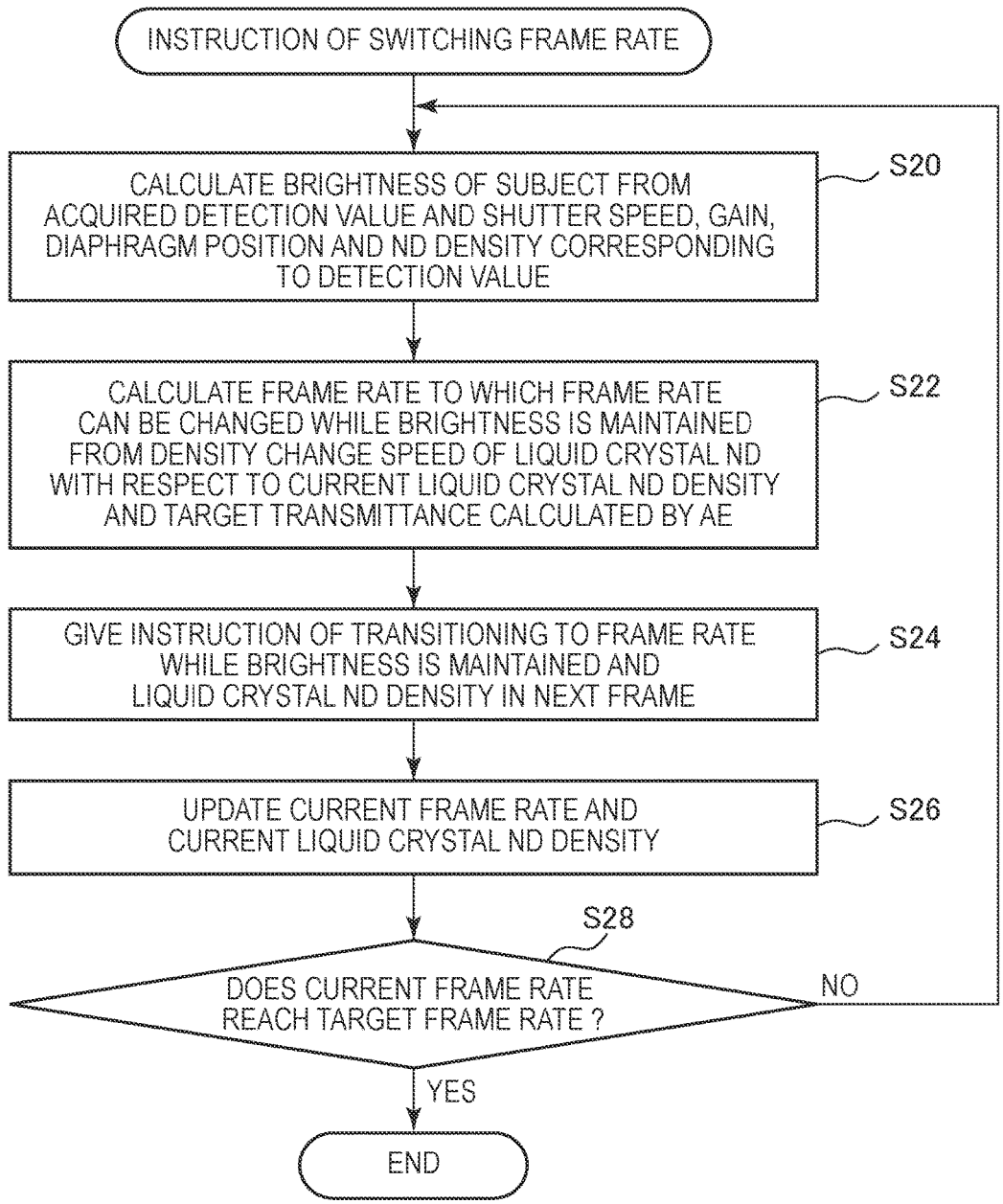
FIG. 6 is a flowchart illustrating processing of applying smoothing to transition speed of AE and a transition amount of the frame rate according to an embodiment of the present disclosure.

A method of, when the transmittance of the liquid crystal ND filter 103 is controlled to perform automatic exposure (AE), applying smoothing to transition speed of AE and a transition amount of the frame rate while taking into account both a transition amount of transmittance for compensating for change of brightness by change of the frame rate and a transition amount of transmittance required for transitioning to brightness targeted by AE will be described next. FIG. 6 is a flowchart illustrating processing in this case.

When the user gives an instruction of switching the frame rate, first, in step S20, a brightness calculating unit 124 of the system controller calculates brightness of a subject from the acquired detection value and output values (shutter speed, a gain, a diaphragm value and transmittance of the liquid crystal ND filter 103) of elements relating to AE. As described above, the digital signal processing unit 107 can generate a detection value of automatic exposure (AE), or the like, from image data, and brightness of the subject can be calculated based on this detection value.

In the next step S22, the range of the frame rate for which brightness can be maintained by making the transmittance of the liquid crystal ND filter 103 coordinate is calculated from the operation speed information of the liquid crystal ND filter 103 held in advance and the target transmittance of the liquid crystal ND filter 103 calculated from the brightness of the subject calculated in step S20. The target transmittance of the liquid crystal ND filter 103 calculated from the brightness of the subject is calculated by the transmittance calculating unit 123 based on the brightness of the subject calculated by the brightness calculating unit 124. Further, the range of the frame rate in which brightness can be maintained is calculated by the frame rate range calculating unit 121.

In the next step S24, in order to change the frame rate within the range of the frame rate calculated in step S22, an instruction of transitioning to the frame rate is output to the frame rate conversion processing unit 122. Further, the transmittance calculating unit 123 calculates transmittance corresponding to change of the frame rate when the frame rate changes within the range of the frame rate calculated in step S22, and outputs an instruction of transitioning to the transmittance to the lens driver 110. The lens driver 110 controls the transmittance of the liquid crystal ND filter 103 based on the received instruction of transitioning to the transmittance.

In the next step S26, the current frame rate and the current transmittance of the liquid crystal ND filter 103 are updated. In the next step S28, if the current frame rate matches the target frame rate, the processing ends. On the other hand, if the current frame rate does not reach the target frame rate, the processing returns to step S20, and processing is repeated so that transition is performed again within the range in which fixed brightness can be maintained. Note that step S24 to S28 are the same as step S12 to S16 in FIG. 5.

As described above, according to the processing in FIG. 6, it is possible to optimally control transition of AE and the transmittance of the liquid crystal ND filter 103 according to transition of the frame rate while taking into account both a transition amount of the transmittance of the liquid crystal ND filter 103 for compensating for change of the brightness by change of the frame rate and a transition amount of the transmittance required for transitioning to the brightness targeted by AE.

Figure 7:
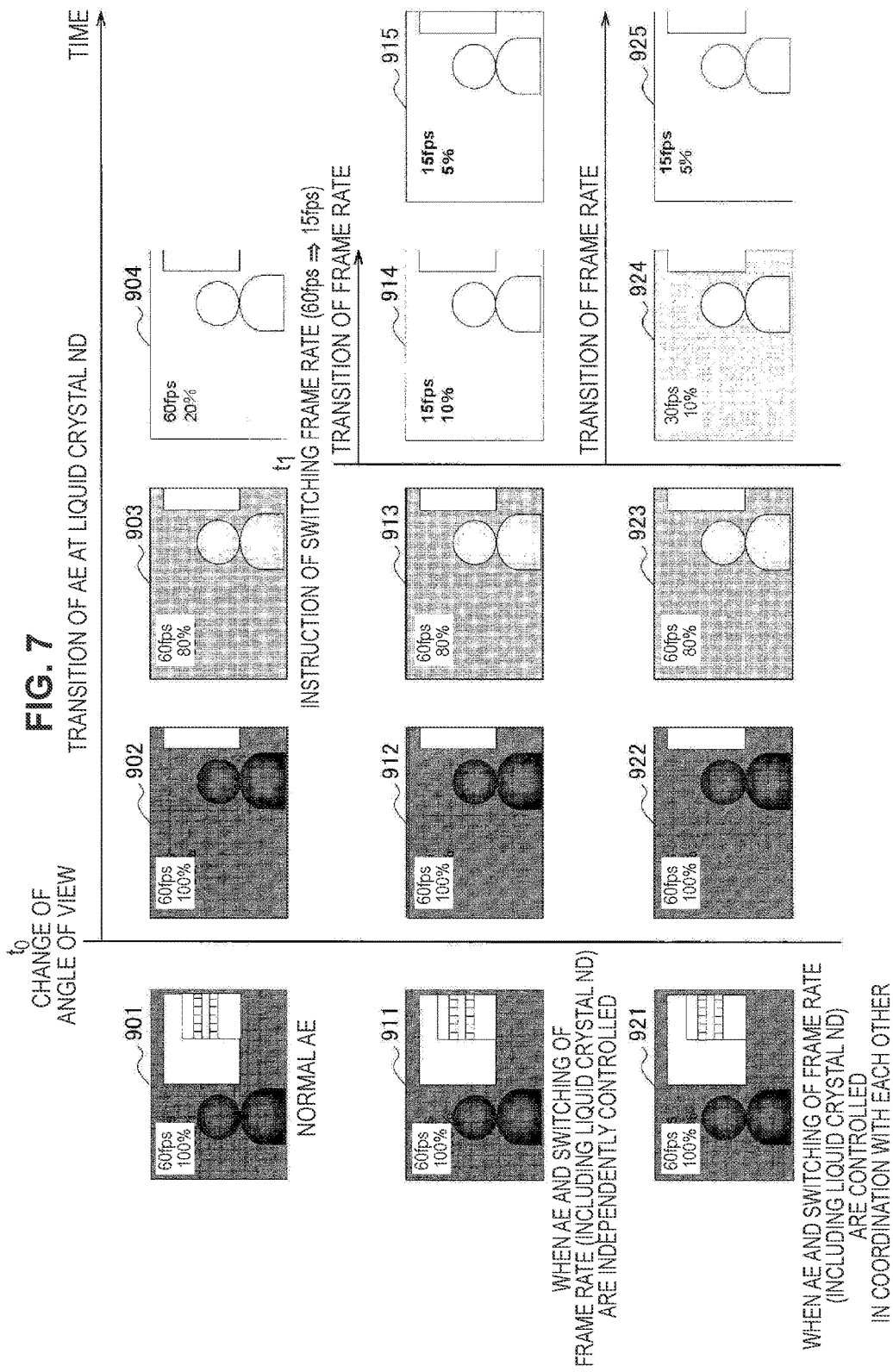
FIG. 7 is a schematic diagram illustrating a case where control of transmittance in accordance with transition of AE and control of maintaining fixed brightness according to change of the frame rate are performed at the same time according to an embodiment of the present disclosure.

FIG. 7 schematically illustrates a case where, when AE is performed only at the liquid crystal ND filter 103, control of the transmittance according to transition of the AE and control of maintaining fixed brightness according to change of the frame rate are performed at the same time, to explain the processing in FIG. 6 in detail. As an example, it is assumed that a maximum change rate of the transmittance of the liquid crystal ND filter 103 (maximum operation speed of the liquid crystal ND filter 103) within one frame is 1/8.

In FIG. 7, images 901 to 904 illustrate transition through normal AE which does not involve change of the frame rate. As illustrated in FIG. 7, it is assumed that, when the frame rate is 60 fps and fixed, the transmittance changes from 100% to 20% by AE. Here, an angle of view changes, and the AE exposure amount starts transitioning in the image 902, the AE exposure amount transitions while the image 902 transitions to the image 903 (transmittance of 80%) so that transition appears smooth, and transition is completed in the image 904 with an optimal value (transmittance of 20%).

Images 911 to 915 illustrate a case where, when transition of the AE exposure amount as with the images 901 to 904 and change (transition) of the frame rate while brightness is maintained occur at the same time, transition of the AE exposure amount and transition of the frame rate while brightness is maintained are controlled independently. When an instruction of changing the frame rate (from 60 fps to 15 fps) is given in the image 914, in addition to transition of the transmittance from 80% to 20% which is to be performed by AE, transition of the transmittance by adding a transition amount (decreasing the transmittance to 1/4) corresponding to an amount for maintaining brightness with respect to change of the frame rate occurs. That is, total transition of the transition by the AE and the transition through the frame rate becomes transition of the transmittance to 5%. In this case, because change of a transition amount (=1/16) of the transmittance exceeding a maximum transition amount (=1/8) of the transmittance in one frame of the liquid crystal ND filter 103 occurs, control is performed so that, in the image 914, the transmittance is lowered to 10%, and in the next frame image 915, the transmittance is lowered to 5%. In this case, the brightness of the image 914 becomes temporarily higher than the target brightness, which results in degradation of appearance of the image.

Therefore, in the present embodiment, control is performed as performed on the images 921 to 925. Transition of the images from 921 to 925 correspond to processing in FIG. 6, and illustrate a case where, when transition by the AE and transition of the frame rate while brightness is maintained occur at the same time, the transition by the AE and the transition of the frame rate while brightness is maintained are controlled in coordination with each other.

While conditions of the images 921 to 925 are the same as those of the images 911 to 915, because a sum of request for change of the transmittance of the liquid crystal ND filter 103 by AE and request for change of the transmittance by change of the frame rate exceeds specifications (operation speed) of the liquid crystal ND filter 103, change of the frame rate is limited once in the image 924, so that the image does not become too bright. This processing corresponds to processing of step S22 and S24 in FIG. 6. As described above, when the frame rate is set at 15 fps in the image 924, because the image becomes bright and fixed brightness cannot be maintained, in this example, in step S22 in FIG. 6, 30 fps is calculated as a frame rate at which brightness can be maintained. By this means, the frame rate of the image 924 is set at 30 fps.

Then, by performing the remaining change of the frame rate and change of the transmittance towards the target, the image 924 transitions to the image 925 while the brightness is maintained, and the frame rate is made to change to the target, 15 fps. By this means, it is possible to realize natural transition without the brightness becoming too high to a high brightness side when the frame rate is switched.

Then, a method for expanding a region in which the frame rate can be changed while the brightness is maintained by using gain control in a low gain region in which an image is comparatively not affected and image quality is acceptable in combination with transition of the transmittance by the liquid crystal ND filter 103 will be described. It is possible to control brightness by multiplying the pixel value by a gain. Here, in the low gain region, influence on the image quality is relatively small, and the image quality can be maintained even when the pixel value is multiplied by the gain. Therefore, in the low gain region, by changing the gain in addition to transition of the transmittance, it is possible to expand a range of control in coordination with the frame rate. Specifically, by using the transition of the transmittance by the liquid crystal ND filter 103 and change of the gain in combination, it is possible to respond to more rapid change of the frame rate. However, because when the gain changes to a negative side, degradation is relatively large, it is desirable that the gain is controlled at a positive side and in the low gain region.

4. Combination Use with Gain Control

Figure 8:
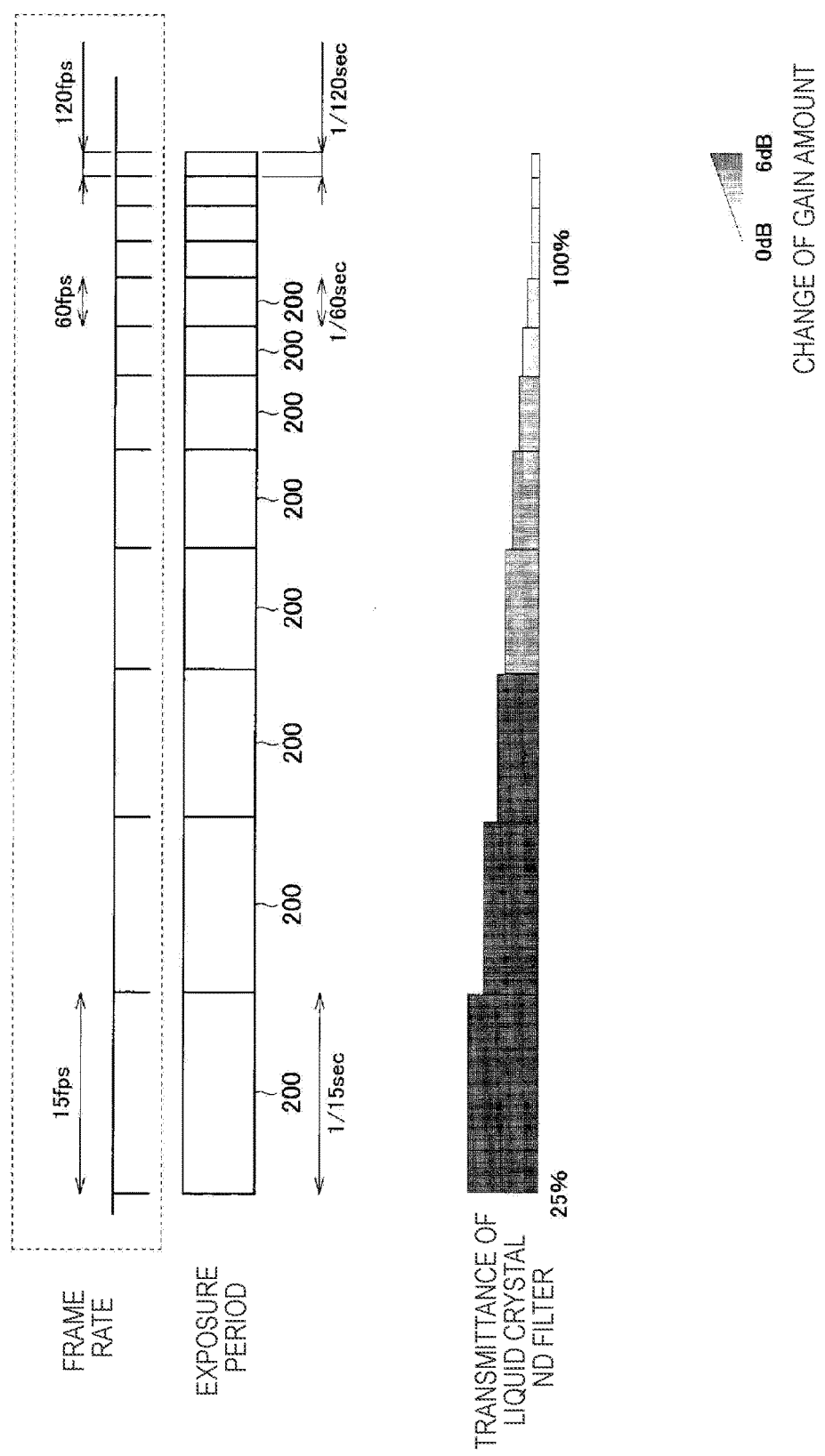
FIG. 8 is a schematic diagram illustrating an example where, in addition to transition of transmittance by the liquid crystal ND filter 103, a gain is controlled in a low gain region, according to an embodiment of the present disclosure.

FIG. 8 is a schematic diagram illustrating an example where the gain is controlled in the low gain region in addition to transition of the transmittance by the liquid crystal ND filter 103. Control of the transmittance at the frame rate from 15 fps to 60 fps is the same as that in FIG. 4. Compared to FIG. 4, the gain is made to change from 0 dB to 6 dB in the low gain region in which the image is less likely to be affected with respect to the transition of the frame rate to a high-speed side higher than the frame rate of 60 fps which is a reference. Specifically, when the frame rate transitions from 60 fps to 120 fps, the gain control unit 125 of the system controller 120 controls the gain from 0 dB to 6 dB. By this means, it is possible to maintain fixed brightness even when the frame rate is made to change to 120 fps, so that it is possible to expand a region of the frame rate in which brightness can be maintained.

5. Combination Use with Image Addition in Memory

An example of combination use with image addition in a memory will be described next. When shooting in the S & Q mode is realized in combination with image addition in the memory, it is possible to make the image darker without degrading image quality by dividing the image by the added number to restore an image. However, there is a defect that resolution becomes rough through division by the added number to restore the image.

Here, by controlling the liquid crystal ND filter 103 to compensate for the roughness of the resolution, it is possible to change the frame rate while the brightness is maintained in high-speed following in a wide range, which cannot be realized with the liquid crystal ND filter 103 alone.

Figures 9, 10:
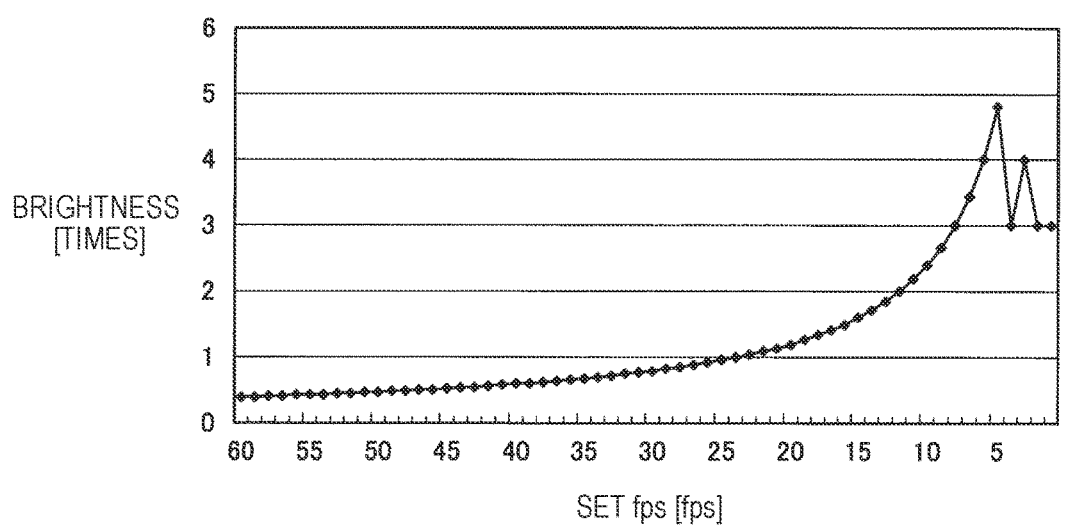
FIG. 9 is a schematic diagram illustrating an example where the number added in a memory is increased when the frame rate decreases according to an embodiment of the present disclosure.
FIG. 10 is a characteristic diagram illustrating change of brightness when the change of the brightness is tried to be suppressed by performing division to restore an image according to the number added in the memory in FIG. 9.

The example will be specifically described below. As illustrated in FIG. 9, when image addition in the memory is used, at a low frame rate side in the S & Q mode, there is a case where a method for realizing the frame rate by using addition of images in the memory in combination is employed. FIG. 9 illustrates an example where, at the low frame rate side of 1 fps to 8 fps, when the frame rate becomes lower, the number added in the memory is increased. In this case, when the image signal is divided by the number added in the memory (the image signal is divided to restore an image), it is possible to lower only the brightness without degrading the image quality.

Further, FIG. 10 illustrates change of the brightness when change of the brightness is suppressed by dividing the image by the number added in the memory to restore an image in FIG. 9. FIG. 10 illustrates a set frame rate [fps] on a horizontal axis and illustrates brightness when brightness at 60 fps is 1 on a vertical axis. As illustrated in graph 1, at a low frame rate side, while a change amount of the brightness tends to increase, the change of the brightness can be made to fall within a predetermined range by performing division to restore an image. Therefore, it is basically possible to maintain fixed brightness when the frame rate changes by performing division to restore an image according to change of the frame rate.

Here, division by the number added in the memory to restore an image and change of density of the liquid crystal ND filter 103 are controlled in coordination with each other. FIG. 11 is a schematic diagram illustrating an example where division by the number added in the memory to restore an image and change of the density of the liquid crystal ND filter 103 are controlled in coordination with each other. FIG. 8 also illustrates an exposure state when the imaging frame rate is made to continuously change in an ideal shutter-off state.

Further, in the example illustrated in FIG. 8, as with in FIG. 9, at 1 fps, addition of eight images in the memory, at 2 fps, addition of four images in the memory, at 3 fps and 4 fps, addition of two images in the memory, and, at 5 to 8 fps, addition of one image in the memory are performed. Therefore, by performing division by the number added in the memory to restore the image, it is possible to lower the brightness at a low frame rate.

On the other hand, as illustrated in FIG. 9, when the frame rate is 3 fps and 4 fps, because the number added in the memory is two in the both cases, if division to restore an image is performed at 3 fps and 4 fps in a similar manner, it is impossible to strictly maintain fixed brightness. In a similar manner, when the frame rate is 5 fps to 8 fps, because the number added in the memory is one in all cases, if division to restore an image is performed in a similar manner respectively at the frame rate of 5 fps to 8 fps, it is impossible to strictly maintain fixed brightness.

Therefore, as illustrated in FIG. 11, when the frame rate is increased, brightness is maintained at the liquid crystal ND filter 103 until a timing at which the added number is switched. By performing addition while switching the transmittance of the liquid crystal ND filter 103 at the timing at which the added number is switched, it is possible to maintain brightness in all the range. For example, while, in the example of FIG. 9, because two images are added in the memory in the both cases of 3 fps and 4 fps, it is impossible to maintain fixed brightness according to change of the frame rate when division to restore an image is performed, in FIG. 11, because the transmittance of the liquid crystal ND filter 103 is increased to 50% when the frame rate is 3 fps, it is possible to make the brightness higher when the frame rate is 3 fps. Therefore, when the same two images are added in the memory, it is possible to maintain fixed brightness at the frame rate of 3 fps when the transmittance of the liquid crystal ND filter 103 is 50%, and at the frame rate of 4 fps when the transmittance of the liquid crystal ND filter 103 is 25%.

In a similar manner, when one image is added in the memory at the frame rate of 5 fps, 6 fps, 7 fps and 8 fps, by changing the transmittance of the liquid crystal ND filter 103 stepwise to 16%, 19%, 22% and 25% in accordance with increase of the frame rate, it is possible to maintain fixed brightness according to change of the frame rate.

Division by the number added in the memory to restore an image is performed by a memory addition control unit 126 of the system controller 120. The memory addition control unit 126 makes the number added in the memory change according to the frame rate as illustrated in FIG. 9 and performs division to restore an image. A transmittance calculating unit 123 calculates the transmittance of the liquid crystal ND filter 103 according to the number added in the memory and the frame rate as illustrated in FIG. 11.

As described above, according to the present embodiment, because the transmittance of the liquid crystal ND filter 103 is controlled according to change of the frame rate, it is possible to maintain fixed brightness even when the frame rate changes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A control apparatus including:

a frame rate control unit configured to control a frame rate of imaging; and a transmittance control unit configured to control transmittance of a filter which transmits light incident on an imaging element according to change of the frame rate so that brightness of an imaged subject is maintained.

(2)
The control apparatus according to (2), including:
a frame rate range calculating unit configured to calculate a range in which it is possible to make the frame rate transition according to operation speed of the filter under a condition
where the brightness of a subject image is maintained, wherein the transmittance control unit controls the transmittance according to the range in which it is possible to make the frame rate transition.

(3)
The control apparatus according to (2),
wherein the transmittance control unit controls the transmittance stepwise according to the range in which it is possible to make the frame rate transition and a target frame rate.

(4)
The control apparatus according to any of (1) to (3), including:
a subject brightness acquiring unit configured to acquire brightness of a subject,
wherein the transmittance control unit controls the transmittance of the filter according to the brightness of the subject and change of the frame rate.

(5)
The control apparatus according to (4), including:
a frame rate range calculating unit configured to calculate a range in which it is possible to make the frame rate transition according to operation speed of the filter under a condition that the brightness of a subject image is maintained,
wherein the transmittance control unit controls the transmittance according to the range in which it is possible to make the frame rate transition.

(6)
The control apparatus according to any of (1) to (5), including:
a gain control unit configured to control a gain by which a pixel value of a subject imaged by the imaging element is multiplied,
wherein the gain control unit controls the gain according to change of the frame rate in a region where the transmittance is high.

(7)
The control apparatus according to claim 1, including:
a memory addition control unit configured to control addition of a pixel value of a subject imaged by the imaging element, in a memory,
wherein the transmittance control unit controls the transmittance according to change of the frame rate and the number added in the memory.

(8)
The control apparatus according to any of (1) to (7), including:
an operation input unit configured to receive input of user operation,
wherein the frame rate control unit controls the frame rate according to the input of the user operation.

(9)
The control apparatus according to (1), including:
an operation input unit configured to receive input of user operation,
wherein the gain control unit controls the gain according to the input of the user operation.

(10)
A control method including:
controlling a frame rate of imaging; and
controlling transmittance of a filter which transmits light incident on an imaging element according to change of the frame rate so that brightness of an imaged subject is maintained.

(11)
An imaging apparatus including:
an imaging element configured to image a subject image for each frame;
a filter disposed at a subject side from the imaging element and configured to transmit light incident on the imaging element;
a frame rate control unit configured to control a frame rate of imaging; and
a transmittance control unit configured to control transmittance of the filter according to change of the frame rate so that brightness of the subject image imaged by the imaging element is maintained.

REFERENCE SIGNS LIST 100 imaging apparatus
103 liquid crystal ND filter
104 imaging element
122 frame rate conversion processing unit
123 transmittance calculating unit

The invention claimed is:

1. A control apparatus, comprising:
a controller configured to:
determine a frame rate range of capture of a moving image of a subject, based on operation speed of a filter, wherein the filter transmits light from the subject on an imaging element; change a first frame rate of capture of the moving image of the subject to a second frame rate of capture of the moving image,
wherein the second frame rate is within the frame rate range; control transmittance of the filter, based on the change of the first frame rate to the second frame rate; and
control a first brightness level of the captured subject, based on the change of the first frame rate to the second frame rate.

2. The control apparatus according to claim 1, wherein the controller is further configured to control the transmittance of the filter in a stepwise order.

3. The control apparatus according to claim 1, wherein the controller is further configured to:
acquire the first brightness level of the captured subject; and
control the transmittance of the filter based on:
the acquired first brightness level; and
the change of the first frame rate.

4. The control apparatus according to claim 1, wherein the controller is further configured to:
change the first frame rate in a low gain region of the moving image,
wherein the transmittance is high in the low gain region; and
control a gain of the captured subject based on the change of the first frame rate in the low gain region.

5. The control apparatus according to claim 3, wherein the controller is further configured to
receive a user input; and
control the gain of the captured subject based on the user input.

6. The control apparatus according to claim 1, wherein the controller is further configured to:
  control addition of a pixel value of the captured subject in a memory; and
  control the transmittance of the filter based on the change of the first frame rate and the pixel value.

7. The control apparatus according to claim 1, wherein the controller is further configured to:
  receive a user input; and
  control the change of the first frame rate based on the user input.

8. A control method, comprising:
  determining, by a controller, a frame rate range of capture of a moving image of a subject, based on operation speed of a filter,
  wherein the filter transmits light from the subject on an imaging element;
  changing, by the controller, a first frame rate of capture of the moving image of the subject to a second frame rate of capture of the moving image,
  wherein the second frame rate is within the frame rate range;
  controlling, by the controller, transmittance of the filter, based on the change of the first frame rate to the second frame rate; and
  controlling, by the controller, a brightness level of the captured subject, based on the change of the first frame rate to the second frame rate.

9. An imaging apparatus, comprising:
  an imaging element configured to capture a moving image of a subject;
  a filter on a subject side of the imaging element, wherein the filter is configured to transmit light from the subject to the imaging element; and
  a controller configured to:
    determine a frame rate range of the capture of the moving image of the subject, based on operation speed of the filter;
    change a first frame rate of the capture of the moving image of the subject to a second frame rate of capture of the moving image,
    wherein the second frame rate is within the frame rate range; control transmittance of the filter based on the change of the first frame rate to the second frame rate; and
    control a brightness level of the captured subject, based on the change of the first frame rate to the second frame rate.

* * * * *